April 19, 1932. M. H. SCHWEIKERT 1,854,627
ATTACHMENT FOR PROP POLES
Filed Sept. 3, 1930
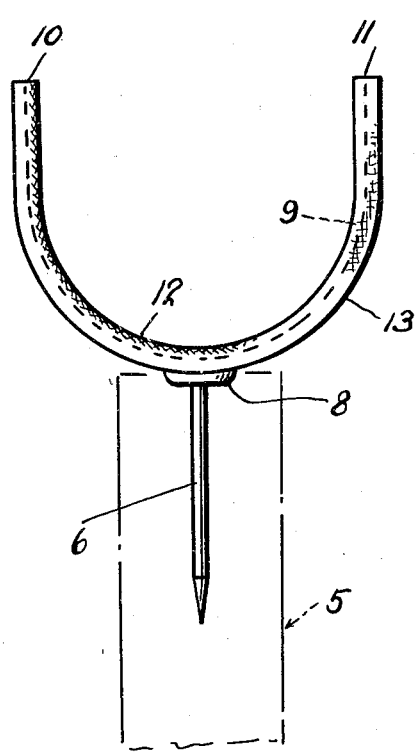
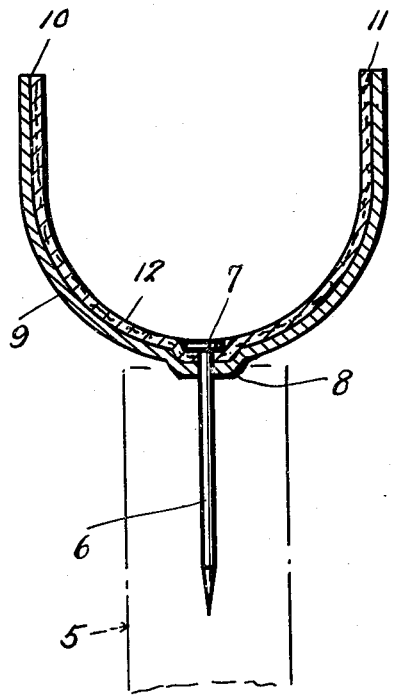
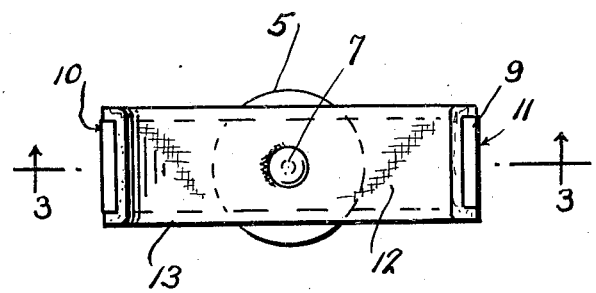
Inventor
M. H. Schweikert
By Clarence A O'Brien
Attorney Patented Apr. 19, 1932

1,854,627

UNITED STATES PATENT OFFICE

MARTIN H. SCHWEIKERT, OF TONASKET, WASHINGTON

ATTACHMENT FOR PROP POLES

Application filed September 3, 1930. Serial No. 479,545.

This invention relates generally to an attachment for a prop pole, which enables the prop pole to efficiently and properly support the limb of a tree or the like in such a manner that the limb will be protected against injury by the prop pole.

It is an object of the invention to provide an attachment for a prop pole of the type described, which is a very simple and inexpensive construction which is at the same time highly efficient and very satisfactory for the purpose for which it is designed.

It is also an object of this invention to provide a device of the character described, which may be easily and quickly and securely attached to the upper end of a prop pole for supporting the limb of a tree.

It is also an object of this invention to provide a device of the character described, which possesses new and novel and improved features and disposition and construction which is provided with a lining and secured to the inner sides of the attachment for contacting the limb of a tree and preventing injuring the bark of the limb under which the device is positioned.

It is also an object of this invention to provide a new and novel arrangement and to accomplish the objects stated which is simple and easily and quickly adapted to the purpose for which it was designed.

It is also an object of this invention to provide a device of the kind described which is cheaply and quickly attached to a prop pole, and which is simple and easy and inexpensive to manufacture.

These and other objects of the invention, its nature and its composition and arrangement and combination of parts will be readily understood by anyone acquainted with the art to which this invention relates upon consulting the following descriptions of the drawings, in which:—

Figure 1 is a general elevational view of one side of my improved attachment for a tree prop, showing the method of and the arrangement of attaching into the upper end of a prop pole.

Figure 2 is a top view thereof.

Figure 3 is a vertical longitudinal section through Figure 1 on the line 3—3.

It is to be understood that I do not desire to limit the application of this invention to the particular modification set forth herein to illustrate the same and any change or changes may be made in material and structure consistent with the spirit and scope of the invention.

Referring in detail to the drawings the numeral 5 indicates generally the upper end portion of a prop pole in which is driven a nail 6 and which has its head 7 in a countersunk portion 8 of a flat malleable bar 9 bent in a form generally of a horse shoe, with straight sides 10 and 11. The countersunk portion 8 is formed through the central portion of the bottom or curved portion 12 of the bar 9. The bar 9 is formed of suitable material such as rolled steel to permit the arms 10 and 11 to be sprung inwardly or outwardly so as to accommodate and fit large or small tree limbs. The bar is made smooth on its inner face to avoid injury to the bark of a tree limb when placed therein.

A liner 13 of soft material such as rubber, leather, or cloth is formed on the inner face of the arms and the curved portion 12 and about the edges of the bar 9 in any suitable manner, so that the possibility of injury to the bark of a tree limb or the like supported by the device is reduced to an unlikelihood.

It will now be seen that I have provided an attachment for a tree prop of the type described which is simply and easily and quickly attached to a prop pole, and easily and quickly positioned for supporting a tree limb or the like, and which is of improved and very simple and inexpensivce construction. The form and character of the liner 13 is not intended to be restricted, and a suggested form is illustrated in the drawings and particularly to advantage in Figure 2 which discloses the only requirement that the latter shall cover the inner surface of the arms and the edges of the bar forming the arms. The important feature to be noted in connection with the said liner 13 is that it is attached to the arms by the head 7 of the nail 6 within the countersunk portion 8, thus providing that the liner is attached to the device by the same means by which the device is attached to position upon the prop pole. The simplicity and economy of this arrangement and structure renders the device highly attractive from an economy standpoint.

What is claimed is:—

An attachment for tree prop poles comprising a malleable bar in the general form of a horse shoe adapted to be engaged with and to support a tree limb, a lining of soft material adapted to cover the inner surface of said bar and overlap the edges thereof, the central part of the bight of the bar having a countersink therein which forms a boss on the outer face of the bar and a recess in the inner face thereof, said boss having a hole therein whereby a nail can be passed through the lining and said hole into a prop with the head of the nail holding a part of the lining in the recess and the boss engaging the end of the prop.

In testimony whereof I affix my signature.

MARTIN H. SCHWEIKERT.